United States Patent [19]

Wszolek

[11] 4,020,966
[45] May 3, 1977

[54] PLASTISOL COMPOSITION AND CONTAINER CLOSURE GASKET MADE THEREFROM

[75] Inventor: Walter R. Wszolek, Sykesville, Md.

[73] Assignee: W. R. Grace & Co., New York, N.Y.

[22] Filed: Mar. 28, 1975

[21] Appl. No.: 563,018

[52] U.S. Cl. .......................... 215/349; 260/18 EP; 260/18 PF; 260/23 EP; 264/268; 277/227; 277/DIG. 8; 428/64

[51] Int. Cl.² .................. B65D 41/10; C08L 23/00; C08L 91/00

[58] Field of Search ...... 260/18 PF, 18 EP, 78.5 R, 260/78.5 BB, 34.2, 23 EP; 264/268; 428/64; 215/349

[56] References Cited

UNITED STATES PATENTS

| | | | |
|---|---|---|---|
| 2,959,559 | 11/1960 | Delius | 260/18 PF |
| 3,006,936 | 10/1961 | Findley et al. | 260/18 PF |
| 3,247,288 | 4/1966 | Masters et al. | 260/23 EP |
| 3,264,272 | 8/1966 | Rees | 428/36 |
| 3,444,281 | 5/1969 | Cahill et al. | 215/349 |
| 3,553,177 | 1/1971 | Hazen et al. | 260/34.2 |
| 3,562,191 | 2/1971 | Giessler | 260/34.2 |
| 3,646,044 | 2/1972 | Sekmakas | 260/78.5 R |
| 3,695,477 | 10/1972 | Edmonston et al. | 260/34.2 |
| 3,846,383 | 11/1974 | Uyama et al. | 260/78.5 R |
| R28,475 | 7/1975 | Blecke et al. | 260/78.5 R |

FOREIGN PATENTS OR APPLICATIONS 1,393,730 2/1965 France

*Primary Examiner*—Allan Lieberman
*Attorney, Agent, or Firm*—Richard P. Plunkett; Kenneth E. Prince

[57] ABSTRACT

A plastisol composition containing as the resin component a copolymer of a normal α-olefin and maleic anhydride (1:1 mole ratio) having the structure

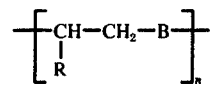

wherein B is a member of the group consisting of

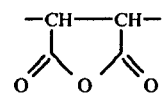

and the hydrolysis product thereof,

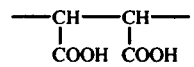

R is H or $C_xH_{2x+1}$, $x$ is 1 to 16 and $n$ is 2-300, and a plasticizer for said resin component. The plastisol when fluxed can be used as a closure gasket for containers.

9 Claims, 1 Drawing Figure

U.S. Patent      May 3, 1977      4,020,966
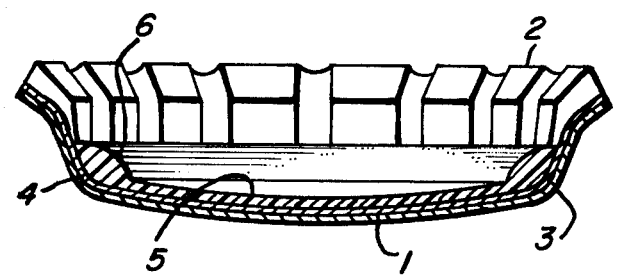

PLASTISOL COMPOSITION AND CONTAINER CLOSURE GASKET MADE THEREFROM

This invention relates to novel plastisol compositions. More particularly, this invention relates to novel plastisol compositions eminently suitable for various uses including sealing container closures.

Conventional plastisol compositions are made up of finely divided thermoplastic resin particles in a liquid, non-volatile plasticizer in which the resin is insoluble at room temperature. On elevating the temperature of the composition, the resin particles are substantially completely solvated by the plasticizer producing a homogeneous solution which is transformed into a rubbery, thermoplastic gel.

Recently the most widely used resin in plastisol compositions has been polyvinyl chloride because of certain inherent characteristics. Vinyl chloride resins produced either by bulk, suspension or aqueous emulsion polymerization or mixtures thereof have been found to be particularly advantageous in such compositions. Vinyl chloride resins produced by aqueous emulsion polymerization, because of their excellent stir-in properties which permit easy dispersion in a liquid plasticizer up to a high concentration of the resin at room temperature to form paste like mixtures, have been found particularly useful, especially as gaskets for sealing container closures.

However, vinyl chloride resins whether produced by bulk, suspension or by emulsion polymerization, have certain drawbacks. That is, the emulsion polymerized vinyl chloride due to the necessity of using an emulsifier results in a plastisol which is semi-cloudy in appearance.

Furthermore, the emulsifier is frequently characterized by syneresis, i.e., it exudes from the gelled composition, thereby imparting a disagreeable taste to the food or beverage in which it is in contact with as a sealant for sealing container closures. In regard to suspension polymerized vinyl chloride resins, they often contain traces of suspending agent left over from the polymerization process and said suspending agents, like the emulsifier used in emulsion polymerization techniques, may later exude or be extracted into foods or beverages. A further problem recently noted in regard to polyvinyl chloride is the possible carcinomatous effect these polymers may have on the human body due to possibly residual vinyl chloride monomer being present in the polymer. In light of the above, there has been a recent search for materials which can be substituted for polyvinyl chloride in various end uses.

Thus one object of the instant invention is to produce a novel plastisol composition. Another object of the instant invention is to produce a plastisol composition which is useful as a sealing gasket in forming closures on containers. Yet another object of the instant invention is to produce a plastisol composition which on gelling substantially minimizes or precludes exuding or extraction of the plasticizer.

The above and other objects are obtained by a plastisol composition containing as the resin component a copolymer of a normal α-olefin and maleic anhydride (1:1 molar ratio) having the structure

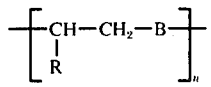

wherein B is a member of the group consisting of

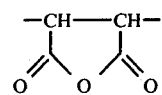

and the hydrolyzed product thereof,

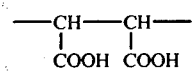

R is H or $C_xH_{2x+1}$, $x$ is 1 to 16 and $n$ is 2–300, and a plasticizer for said resin component. The maleic anhydride containing copolymer is operable in plastisols in particle sizes ranging from about 0.1 to about 1500 microns, preferably 10 to 1000 microns. The plastisol when fluxed can be used as a closure gasket for containers.

The plastisol of the invention operates in the same method as conventional plastisols. That is herein the term "plastisol" refers to dispersions of finely divided thermoplastic resin particles in a liquid non-volatile plasticizer in which the resin is insoluble or only very slightly soluble at room temperature. However, at elevated temperatures the resin fluxes, i.e. is substantially completely solvated by the plasticizer so that a homogeneous solution is obtained which forms a rubbery thermoplastic mass. However, if the plasticizer is such that it reacts with the resin, a thermoset mass is obtained. In addition to the resin and the plasticizer, the formulation may also contain fillers, pigments, stabilizers and various other conventional compounding ingredients.

The plastisol compositions herein are formed by admixture of 100 parts by weight of the copolymer resin with about 65 to 600 parts by weight of a plasticizer per 100 parts of resin and thereafter heating the plastisol admixture to the melting point of the copolymer resin for a time sufficient to solvate the resin by the plasticizer. Since the solvation process is time-temperature dependent, it is possible to heat the plastisol at temperatures beloe the melting point of the resin for longer periods of time to obtain a homgeneous solution which will form a rubbery mass. Additionally it is also possible to heat the plastisol composition above the melting point of the resin and obtain a fluxed product. Thus for example it is possible to heat a plastisol composition consisting of 100 parts hexene-1/ maleic anhydride copolymer resin (melting range 156°–164° C) and 100 parts epoxidized soybean oil at a temperature of 106° C for 18 minutes and obtain a fluxed product. The same composition could be heated at 156° C for 12 minutes or at 200° C for 2 minutes to obtain a fluxed product.

The basis of all closures for air-tight containers is to hold the closure firmly against a resilient gasket which seats on the mouth of the container.

There are three basic methods of forming gaskets and closures. The first consists in depositing a measured amount of liquid gasket-forming composition onto the center of a rotating closure whereby the composition is distributed over the panel section by centrifugal force. While the rotary method produces gasketed closures rapidly, its use is mainly limited to forming gaskets and closures having a circular shape.

The second method involves a molding technique in which a liquid gasket-forming composition is deposited in the center portion of a closure cell and the composition is shaped over the panel area by a plunger which may or may not be heated. A third method provides a heated die having a desired gasket configuration incised on its face. The die is immersed in a mass of plastisol material whereby the material adheres to the die face and transferring the resultant designed from the die to a closure. The design on the die face may be circular, oval, ellipsoidal, square, triangular, rectangular, etc., and the transferred gasket design conforms to the shape of the closure cell. See U.S. Pat. No. 3,462,331. The novel plastisol composition of the instant invention can be used with any of the aforesaid methods for forming gaskets as container closures.

The plasticizer employed in the blend of the invention should be capable of solvating or dissolving the $\alpha$-olefinmaleic anhydride copolymer resin when heated and remain essentially completely compatible with the resin upon cooling. Illustrative plasticizers include, but are not limited to, dialkyl phthalates such as dioctyl phthalate(di-2-ethyl hexyl phthalate) and octyl decyl phthalate, alkyl phthalyl alkyl glycolates, such as ethyl phthalyl ethyl glycolate and butyl phthalyl butyl glycolate, dialkyl esters of alkane dicarboxylic acids, such as diisobutyl adipate and dibutyl sebacate, acetyl trialkyl citrates, such as acetyl tributyl citrate and trialkyl and triaryl phosphates, such as trioctyl phosphate and tricresyl phosphate. Other useful plasticizers include alkyl esters of fatty acids such as octyl stearate; epoxidized triglycerides such as epoxidized soybean oil and polymeric polyester plasticizers such as polymeric glycol adipate. Additionally plasticizers such as polyesters derived from dibasic acids and glycols may also be used. Examples of such type include but are not limited to dipropylene glycol dibenzoate, diethylene glycol dibenzoate, triethylene glycol dibenzoate, polyethylene glycol 200 dibenzoate, polyethylene glycol 600 dibenzoate, and the like. Additionally glycols per se such as polyethylene glycol having a molecular weight of about 600 can also be employed as the plasticizer in the instant composition. Mixtures of the aforesaid plasticizers are also operable.

The amount of plasticizer employed can range between about 65 to about 600, preferably 80 to 200 parts by weight per hundred parts by weight of the resin component.

If desired, it is also possible to include thickening agents in the plastisol composition. Said thickening agents prevent packing of the resin component over extended periods of time. Siliceous thickening agents are suitable herein and contain at least one silicon-oxygen bond examplified by such materials as the alkaline metal silicates, e.g., sodium silicate, alkaline earth metal silicates, e.g., calcium silicate, talc, etc. Colloidal silica can also be used as the thickening agent in the composition of the instant invention. Thickening agents are usually added in amounts ranging from 0.10 to 5 weight percent of the resin and plasticizer components.

Other conventional additives may be included in the composition of the invention in amounts, e.g. up to about 70 weight percent provided that such additives do not deleteriously affect the characteristics of the composition. Examples of such materials are fillers such as wood flour and diatomaceous earth; stabilizers such as tetrasodium pyrophosphate, tribasic lead silicate, calcium stearate, zinc stearate, dibasic lead stearate, organo-tin complexes; pigments such as carbon black, titanium dioxide, and aluminum powder; and dispersing agents such as zinc resinate, lecithin, glycol stearate, propylene glycol laurate and glycerol monooleate.

Furthermore, the plastisols of the instant invention can be puffed or foamed using water or conventional foaming methods and blowing agents. Examples of suitable blowing agents for use herein, include but are not limited to, azo compounds such as azobisisobutyronitrile and diazoaminobenzene; N-nitroso -compounds such as N,N'-di-methy-N,N'-dinitroso-terephthalamide; sulfonyl hydrazides such as 4,4'-oxybiz (benzenesulfonyl hydrazide) and the like. Good cell formation together with an impervious surface are realized when 0.2 to b 5.0% based on the weight of the resin of a blowing agent or mixtures thereof is used in the plastisol formulation.

In practicing the instant invention it is not only possible to form thermoplastic compositions on heating and subsequent cooling but also to form thermoset compositions. That is, by proper selection of the plasticizer or other additive, reactions with the anhydride or acid functionality of the copolymer resin results in a thermoset material.

Compositions comprising the alpha-olefin/maleic anhydride copolymers of this invention can be converted to apparently or actually crosslinked products insoluble in many common solvents and infusible at considerably elevated temperatures. One means of preparing such crosslinked materials is to admix in the composition certain free metallic cations selected mainly from Groups I, II, III and VIII of the Periodic Table of the elements. The exact nature of the forces leading to crosslinking is not understood at this time. There is reason to believe, however, that strong ionic interchain forces play the major role in controlling properties of the final admixed and fluxed compositions. These ionic forces are developed between ionized carboxyl groups derived from the pendant anhydride or acid moieties and the free metallic cations, similar to forces postulated for somewhat similar copolymers described in Fr. 1,393,730. Ionizable metallic compounds useful for making ionically reinforced compositions of this type are selected from Group I, II, III, or VIII of the Periodic Table. According to the aforesaid French patent which is the counterpart of U.S. Pat. No. 3,264,272, issued Aug. 2, 1966, "as appropriate monovalent metallic ions one may cite na+, K+, Li+, Cs+, Ag+, hg+, and; as divalent metallic ions, Be++, Cd++, Mg++, Ca++, Sr++, Ba++, Cu++, Hg++, Sn++, Pb++, Fe++, Co++, Ni++ and Zn++; as trivalent ions, Al+++, Sc+++, Fe+++ and Y+++".

The said French patent teaches the use of certain specific compounds that provide the aforesaid ions, namely sodium hydroxide, lithium hydroxide, zinc acetate, magnesium acetate, aluminum hydroxide, metallic zinc, zinc oxide, zinc stearate, nickel acetate, cobalt acetate, sodium carbonate, tin acetate, sodium methylate, sodium formate, strontium hydroxide and lithium hydroxide.

Obviously, metals that provide ions above listed are available in numerous other compounds, and the above listing of specific compounds is intended to be merely typical of those that are suitable.

Another means of crosslinking the copolymer compositions of this invention is to use covalent chemical bonding techniques. This is accomplished in one instance by interacting the pendant anhydride and/or carboxylic acid groups with appropriate compounds that contain two or more reactive hydrogen containing functional groups. These compounds in essence are considered herein as reactive plasticizers, i.e, they serve the function as plasticizers until the plastisol is fluxed, at which time they are partially or completely chemically bound to the resin polymer backbone. These compounds can be used alone with the resin or in combination with nonreactive plasticizers. Compounds of this type include but are not limited to polyols; polyamines; polythiols; etc. In another instance the pendant anhydride and or carboxylic acid groups are reacted with other reactive species exemplified by but not limited to polyisocyanates, polyepoxides, polyhydrazides, hydroxyamines, hydroxythiols, aminothiols, hydroxyepoxides and the like. Thus herein it is possible to select a plasticizer containing di- or polyamine, epoxy, isocyanate or hydroxy groups therein which on heating results in a thermoset material. For example, a plasticizer such a tetraethylene pentamine reacts with the anhydride groups on the copolymer resin to yield an acid and a half amide of the anhydride on heating which yields a thermoset product. The same is true for an epoxy containing compound such as epoxidized soybean oil which will react with the anhydride group of the copolymer resin and result in a thermoset material. A further example of the formation of such a thermoset material would be the reaction between a plasticizer such as polyethylene glycol wherein the hydroxyl groups on the polyethylene glycol will react with the anhydride to yield the half ester of the anhydride and result in a thermoset material. Thus the anhydride copolymer resin herein may be crosslinked by reaction with various polyfunctional hydroxy, amine and epoxy containing compounds as will be shown by examples hereinafter. A further method of accomplishing crosslinking herein is by heating the anhydride or acid containing copolymer resin with a crosslinking or a non-crosslinking plasticizer and certain ionizable metallic compounds wherein the metal is selected from Groups I, II, III and VIII of the Periodic Table such as calcium oxide, magnesium oxide, sodium carbonate, barium oxide, strontium oxide, zinc oxide and aluminum oxide. These ionizable metallic compounds are added to the plastisol composition in an amount ranging from about 0.5 to 50 parts per 100 parts copolymer resin.

A cross-sectional view of a crown closure containing a fluxed vinyl resin plastisol liner of this invention is shown in the accompanying drawing.

Referring to the FIGURE, the crown shell which is shown inverted has a circular top portion 1 and a crimped skirt portion 2 joined by a smoothly curved top corner edge 3. The interior of the shell has an overall lacquer coating 4. Superimposed on the lacquer coating and adhered thereto is the resin plastisol of the instant invention as a sealing liner which has a thin central portion 5 and a substantially thicker annular sealing portion 6.

The following examples are set forth herein to explain, but expressly not limit, the instant invention. Unless otherwise noted, all parts and percentages are by weight.

EXAMPLE 1

Several plastisol compositions were formulated using various amounts and kinds of commercially available alphaolefin and maleic anhydride copolymer resins having a particle size of minus 500 microns. The compositions after being homogeneously admixed were placed in a forced air oven for 10 minutes at 200° C. Various of the resultant solidified, fluxed products were measured for Shore A Hardness. The compositions are designated A-N and are listed in Table I.

In all cases the compositions before heating, had a good rheology, i.e. a fluid, slightly pasty composition which flowed through an orifice under pressure without a tendency to plug, i.e. filter the plasticizer out of the composition. Furthermore compositions H-M indicated they were thermoset materials since on being reheated, after fluxing and cooling, they failed to flow. The Shore A Hardness data of compositions A-H of the instant invention indicates the flexibility of the plastisol compositions which can be obtained. Thus, one can formulate plastisol compositions of the instant invention over a wide range to obtain the properties desired for a particular end use.

TABLE I

| Composition, parts by weight | A | B | C | D | E | F | G | H[6] | I[6] | J[6] | K[6] | L[6] | M[6] | N[6] | O[6] |
|---|---|---|---|---|---|---|---|---|---|---|---|---|---|---|---|
| ethylene/maleic anhydride copolymer[1] | | | | | | | | | | | | | | 10 | |
| ethylene/maleic acid copolymer[2] | | | | | | | | | | | | | | | 10 |
| hexene-1/maleic anhydride copolymer[3] | 20 | 20 | 20 | 20 | | | 20 | 20 | 10 | 10 | 10 | 10 | 10 | | |
| octadecene-1/maleic anhydride copolymer[4] | | | | | 20 | 20 | | | | | | | | | |
| dipropylene glycol dibenzoate | 14 | 20 | 10 | 17 | 14 | 20 | | | | | | | | | |
| epoxidized soybean oil | | | | | | | | | | | | | | 10 | 10 |
| polyethylene glycol[5] | | | | | | | 20 | 20 | | | | | | | |
| tetraethylene pentamine | | | | | | | | | 10 | | | | | | |
| dioctyl phthalate | | | | | | | | | | 14 | 14 | 14 | 14 | | |
| ZnO | | | | | | | | | | | 5 | | | | |
| CaO | | | | | | | | 0.1 | | 5 | | | | | |
| Al₂O₃ | | | | | | | | | | | | 5 | | | |
| Na₂CO₃ | | | | | | | | | | | | | 5 | | |
| Shore A Hardness on Cooling | 97 | 73 | 100 | 82 | 31 | 13 | 54 | 84 | | | | | | | |

[1]Melting Pt. 235° C; Equivalent acid value 890; M Wgt. 30,000
[2]Melting Pt. 217° C; Equivalent acid value 890
[3]Melting Range 156-164° C; Equivalent acid value 617 [4]Melting Range 115-119° C; Equivalent acid value 321; M Wgt. 20,000
[5]Molecular wgt. 600
[6]After fluxing and cooling, product returned to oven at 250° C for 20 minutes. Lack of flow indicates thermoset material.

The following example shows the use of the composition of the instant invention in forming a sealing gasket in a closure.

EXAMPLE II

The following plastisol composition was admixed in a tray until homogeneous:
- 45 parts commercially available hexene-1/maleic anhydride copolymer (minus 500 microns particle size; molecular weight 30,000)
- 27.5 parts commercially available polypropylene glycol - molecular weight 425
- 27.5 parts epoxidized soybean oil A heated cylindrical die face provided with a peripheral channel adapted to form a gasket having an annular ring integral with a thin center portion was immersed in the tank containing the plastisol to a depth sufficient to fill the peripheral channel with plastisol with a concommitant pick-up of a thin center portion, i.e, 180-250 milligrams plastisol. The heat from the die caused that portion of the plastisol in contact with the die face to partially flux and adhere to the die. The die and the adhered plastisol was then transferred to a closure shell of tin-free steel with a protective coating of vinyl resin lacquered thereon. The shell is situated in a single station arbor press. The die is held in the shell for a period of 1.5-6 seconds at a temperature ranging from 275°-375° F and a pressure of 150-200 psi. The die is removed and the shell with the partially fluxed plastisol was post baked for 50 seconds at 390° F in a forced air oven to convert the partially formed gasket to a solidified, cohesive form. The resultant gasket was a resiliant cohesive mass which was able to withstand standard carbonation tests.

EXAMPLE III

A plastisol composition was made up by admixing 50 parts by weight of commercially available hexene-1/maleic anhydride copolymer resin (−500 microns) having a melting point range of 156°-164° C and 50 parts by weight of commercially available polyoxypropylene glycol having a molecular weight of about 425 until the mixture was homogeneous. Using a No. 3 Meyer bar, the following articles were coated with the plastisol mixture:
a. cotton jersey
b. vinyl asbestos floor tile
c. a piece of white pine wood
d. concrete block
e. polyester terephthalate film "Mylar"
f. aluminum sheet
g. glass
h. ceramic tile.

The coated articles were then heated at a temperature between 175°-200° C in a forced air oven for 10 minutes. On removal it was noted that a clear, continuous, adhesive coating of the plastisol resulted on each of the various substrates.

The following examples in Table II show the operability of the copolymer of the instant invention to form a plastisol with various plasticizers. In all examples in Table II, 100 parts by weight of commercially available hexene-1/maleic anhydride copolymer (−500 microns) was used as the resin. The plastisols were all heated at 200° C for 10 minutes in a forced air oven. The Shore A Hardness was measured after cooling the fluxed product to room temperature.

TABLE II

| Plasticizers Type | Parts by Weight | Shore A Hardness |
|---|---|---|
| I. Unreactive Plasticizers | | |
| Dibutyl phthalate | 100 | 45 |
| Dioctyl azelate | 80 | 20 |
| Butyl benzyl phthalate | 90 | 70 |
| n-Octyl decyl phthalate | 100 | 50 |
| Tetralin | 100 | 90 |
| Trimethylolpropane triacrylate | 80 | >90 |
| Ditridecyl phthalate | 100 | 11 |
| II. Reactive Plasticizers | | |
| Epoxidized Soybean Oil | 150 | 80 |
| Octyl epoxy tallate | 100 | 90 |
| Polypropylene glycol 425 | 100 | 65 |
| Polyethylene glycol 600 | 100 | 62 |
| Polyethylene glycol 200 | 100 | 12 |
| Ethylene glycol | 100 | 8 |
| Diethylene glycol | 100 | 29 |
| Dipropylene glycol | 100 | 27 |
| A polyether polyol having a mole weight of 1000; hydroxyl no. of 168.5; commerically available from Union Carbide under the tradename "Niax LG-168" | 100 | 70 |
| A bisphenol A based epoxy liquid resin commerically available from Dow Chemical Co. under the tradename "Epoxy DER 331" | 615 | 15 |
| An epichlorohydrin/bisphenol A type liquid epoxy resin commerically available from Dow Chemical Co. under the tradename "Epoxy DER 317" | 300 | 82 |
| A low molecular weight epichlorohydrin/bisphenol A-type liquid epoxy resin commercially available from Shell Chemical Co. under the tradename "Epoxy EPON 828" | 400 | 49 |
| A epichlorohydrin/bisphenol A-type liquid epoxy resin commerically available from Shell Chemical Co. under the tradename "Epoxy EPON 825" | 300 | 34 |
| A mixture of branched di- and tri-epoxides made by the condensation of epichlorohydrin and glycerine having an epoxide functionality of 2.2, commerically available from Shell Chemical Co. under the tradename "Epoxy EPON 812" | 300 | 72 |
| A dicyclodiepoxy carboxylate commercially available from Union Carbide under the tradename "UNOX 201" | 200 | 89 |
| Dipropylene glycol | 65 | 88 |

EXAMPLE IV

The following examples in Table III show the operability of the plastisol composition of the instant invention with various fillers. In all examples 100 parts by weight of commercially available hexene-1/maleic anhydride copolymer resin (−500 microns) was admixed with commercially available epoxidized soybean oil in varying amounts along with the various fillers shown in Table III. The resultant plastisol was heated at 200° C in a forced air oven for 10 minutes. After cooling the Shore A hardness was measured on the fluxed, solidified, cured product.

TABLE III

| Epoxidized Soybean Oil | CaCO₃ | Talc | "Cab-o-sil"¹ | Shore A Hardness |
|---|---|---|---|---|
| 300 | | 300 | | 62 |
| 330 | | 270 | | 65 |
| 360 | | 240 | | 69 |
| 390 | | 210 | | 78 |
| 420 | | 180 | | 82 |
| 450 | | 150 | | 86 |
| 300 | 300 | | | 68 |
| 330 | 270 | | | 70 |
| 360 | 240 | | | 71 |
| 390 | 210 | | | 78 |
| 420 | 180 | | | 84 |
| 450 | 150 | | | 87 |
| 575 | 100 | | 30 | 50 |

¹Colloidal silica commercially available from Cabot Corp.

EXAMPLE V

The following examples in Table IV show various plastisol compositions wherein admixtures of various plasticizers with or without fillers were formed. In all the examples in Table IV, 100 parts by weight of commercially available hexene-1/maleic anhydride copolymer resin (−500 microns) was admixed with varying amounts of epoxidized soybean oil and other plasticizers with or without fillers as set forth in Table IV. The admixed plastisols were fluxed in a forced air oven at 200° C for 10 minutes. The Shore A hardness was measured after cooling.

TABLE IV

Mixtures of Epoxidized Soybean Oil with Other Plasticizers
(100 parts hexene-1/maleic anhydride copolymer)

| Soybean Oil | Other (parts) | Talc | CaCO₃ | Hardness |
|---|---|---|---|---|
| 70 | Dioctyl adipate (30) | | | 90 |
| 70 | Light Mineral Oil (30) | | | 73 |
| 70 | Trioctyl trimellitate (30) | | | 82 |
| 70 | Diisodecyl phthalate (30) | | | 86 |
| 70 | Dioctyl isophthalate (30) | | | 90 |
| 80 | Dioctyl phthalate (20) | | | >90 |
| 60 | Dioctyl phthalate (40) | | | >90 |
| 40 | Dioctyl phthalate (60) | | | 80 |
| 20 | Dioctyl phthalate (80) | | | 51 |
| 150 | Dioctyl phthalate (150) | 100 | | 41 |
| 165 | Dioctyl phthalate (165) | 82 | | 42 |
| 180 | Dioctyl phthalate (180) | 66 | | 49 |
| 195 | Dioctyl phthalate (195) | 54 | | 61 |
| 210 | Dioctyl phthalate (210) | 43 | | 75 |
| 225 | Dioctyl phthalate (225) | 33 | | 77 |
| 150 | Dioctyl phthalate (150) | | 100 | 40 |
| 165 | Dioctyl phthalate (165) | | 82 | 50 |
| 180 | Dioctyl phthalate (180) | | 66 | 60 |
| 195 | Dioctyl phthalate (195) | | 54 | 62 |
| 210 | Dioctyl phthalate (210) | | 43 | 73 |
| 225 | Dioctyl phthalate (225) | | 33 | 76 |

EXAMPLE VI

The following examples in Table V set forth various copolymer resins operable in the plastisol composition of the instant invention. In all examples, 100 parts by weight of the commercially available copolymer resin were admixed with varying amounts of the plasticizers set forth in the table and then fluxed in a forced air oven at 200° C during a 10 minute period. The Shore A hardness of the fluxed, solidified plastisol was measured after cooling.

TABLE V

| Resin¹ | Plasticizer (Parts) | Hardness |
|---|---|---|
| Decene-1/maleic anhydride copolymer | Epoxidized Soybean Oil (100) | 49 |
| Tetradecene-1/maleic anhydride copolymer | Epoxidized Soybean Oil (100) | 32 |
| Octadecene-1/maleic anhydride copolymer | Epoxidized Soybean Oil (100) | 20 |
| Octadecene-1/maleic anhydride copolymer | A bisphenol A based epoxy liquid resin commercially available from Dow Chemical Co. under the tradename "Epoxy DER 331" (300) | 42 |
| Octadecene-1/maleic anhydride copolymer | An epichlorohydrin/bisphenol A type liquid epoxy resin commercially available from Dow Chemical Co. under the tradename "Epoxy DER 317" (300) | 36 |
| Octadecene-1/maleic anhydride copolymer | A low molecular weight epichlorohydrin/bisphenol A - type liquid epoxy resin commercially available from Shell Chemical Co. under the tradename "Epoxy EPON 828" (300) | 47 |
| Octadecene-1/maleic anhydride copolymer | Epichlorohydrin/bisphenol A-type liquid epoxy resin commercially available from Shell Chemical Co. under the tradename "Epoxy EPON 825" (300) | 62 |
| Octadecene-1/maleic anhydride copolymer | A mixture of branched di- and tri-epoxides made by the condensation of epichlorohydrin and glycerine having an epoxide functionality of 2.2, commercially available from Shell Chemical Co. under the tradename "Epoxy EPON 812" (200) | 13 |
| Octacecene-1/maleic anhydride copolymer | A dicyclodiepoxy carboxylate commercially available from Union Carbide under the tradename "UNOX 201" (200) | 46 |

¹100 parts by weight

EXAMPLE VII

To show the bonding ability of the plastisols of the instant invention, 100 parts by weight of a commercially available hexene-1/maleic anhydride copolymer resin (−500 microns) was admixed with various plasticizers, applied between various metal plates and pressed on a platen press at 160° C for 10 minutes to bond the plates together. The thus bonded plates were then measured at 23°±1°C and 50% RH for lap shear in accord with the procedure set out in ASTM 1002-64 on an Instron Tensile tester at a rate of strain of 1 inch/minute. The results are set forth in Table VI.

TABLE VI

| Type | Plasticizer Parts by Weight | Adhering Metal | Lap Shear lbs./in.² |
|---|---|---|---|
| A low molecular weight epichlorohydrin/bisphenol A-type liquid epoxy resin commercially available from Shell Chemical Co. under the tradename "Epoxy EPON 828" | 75 | Black Plate | 467.5 |
| A low molecular weight epichlorohydrin/bisphenol A-type liquid epoxy resin commercially available from Shell Chemical Co. under the tradename "Epoxy EPON 828" | 75 | Tin Plate | 390.5 |
| A low molcular weight epichlorohydrin/bisphenol A-type liquid epoxy resin commercially available from Shell Chemical Co. under the tradename "Epoxy EPON 828" | 75 | Tin Free Steel | 238 |
| Polypropylene glycol-425 | 100 | Tin Plate | 301.5 |
| Polypropylene glycol-425 | 100 | Black Plate | 326 |
| Polypropylene glycol-425 | 100 | Tin Free Steel | 505.5 |

EXAMPLE VIII

A plastic cap closure having a I. Dia of 2½inches was placed flat-side down and another plastic cap closure having an O. Dia of 1 ¾inches was inserted therein concentrically. The annulus between the plastic cap closures was filled to a depth of about ¼ inch with a plastisol composition consisting of 100 parts by weight of a commercially available hexene-1/maleic anhydride copolymer resin having a particle size of −500 microns and a molecular weight of about 30,000 and 100 parts by weight of commercially available propylene glycol having a molecular weight of 425. A glass cylinder, 3 inches high, having an I. Dia of 1 15/16 inches and an O. Dia of 2 5/16 inches was pressed into the plastisol in the annulus and the thus formed element was thereafter placed in a forced air oven for 10 minutes at 160° C to flux the plastisol and form a sealant therewith. The element was removed from the oven and cooled to room temperature. The lower sealed portion of the glass cylinder was placed in a water bath to determine whether or not water would escape through the sealant into the central portion of the glass cylinder. No water pased through the sealant into the central portion of the glass cylinder during a 24 hour period.

EXAMPLE IX

A plastisol composition consisting of 10 parts by weight of commercially available hexene-1/maleic anhydride copolymer resin (−500 microns) and 10 parts by weight of commercially available polypropylene glycol having a molecular weight of 425 were admixed and charged to a 2 inches circular mold having a height of ¼ inch which had previously been sprayed with a silicone release agent. The mold was placed in a forced air oven for 10 minutes at 200° C. A solid, homogeneous mass in the shape of the mold was removed from the mold.

The plastisol composition of the instant invention has many and varied uses. Such uses include but are not limited to, a material for use as gaskets, closures, decorative and protective coatings, caulks, architectural and automotive sealants, adhesives, mastics, thermosetting or thermoplastic fiber reinforced composites, impregnants, binders, sizes, printing plates, photoresists, lacquers, potting and encapsulation compounds, side seam cements, shaped molded articles and the like.

What is claimed is:

1. A plastisol composition comprising (a) a copolymer resin of a normal α-olefin and maleic anhydride (1:1 mole ratio) having a particle size in the range from about 0.1 to about 1500 microns and having the structure

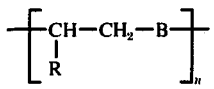

wherein B is a member of the group consisting of

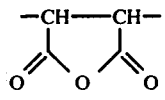

and

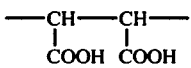

R is H or $C_xH_{2x+1}$  $x$ is 1 to 16 and $n$ is 2–300, and (b) 65–600 parts/100 parts copolymer of a polyepoxide plasticizer.

2. The composition of claim 1 wherein the epoxy containing plasticizer is epoxidized soybean oil.

3. The composition of claim 1 including an ionizable metallic compound wherein the metal is selected from Group I, Group II, Group III or Group VIII of the Periodic Table.

4. A container closure comprising a cap having deposited therein a resinous mass functioning as a gasket to seal the container when the closure is in sealing relationship with the container, said resinous mass comprising a fluxed plastisol of a composition comprising (a) a copolymer resin of a normal α-olefin and maleic anhydride (1:1mole ratio) having a particle size in the range from about 0.1 to about 1500 microns and having the structure.

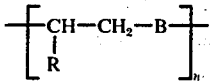

wherein B is a member of the group consisting of

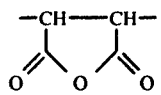

and

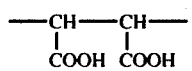

R is H or $C_xH_{2x+1}$  x is 1 to 16 and n is 2–300, and (b) 65–600 parts/100 parts copolymer of a polyepoxide plasticizer.

5. The container closure of claim 4 wherein the plasticizer is expoxidized soybean oil.

6. The container closure of claim 4 wherein the composition includes an ionizable metallic compound wherein the metal is selected from Group I, Group II, Group III or Group VIII of the Periodic Table.

7. The process of forming a solidified, homogeneous mass which comprises admixing a plastisol composition comprising (a) a copolymer resin of a normal α-olefin and maleic anhydride (1:1 mole ratio) having a particle size in the range from about 0.1 to about 1500 microns and having the structure

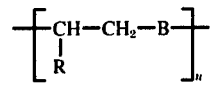

wherein B is a member of the group consisting of

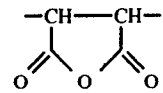

and

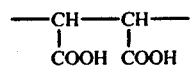

R is H or $C_xH_{2x+1}$  x is 1 to 16 and n is 2–300, and (b) 65–600 parts/100 parts copolymer of a polyepoxide plasticizer and, thereafter, heating the admixture for a time sufficient to flux the mass.

8. The process according to claim 7 wherein the plasticizer is an epoxidized soybean oil.

9. The process according to claim 7 wherein the composition includes an ionizable metallic compound wherein the metal is selected from Group I, Group II, Group III or Group VIII of the Periodic Table.

* * * * *

UNITED STATES PATENT AND TRADEMARK OFFICE
CERTIFICATE OF CORRECTION

PATENT NO. : 4,020,966
DATED : May 3, 1977
INVENTOR(S) : Walter R. Wszolek

It is certified that error appears in the above-identified patent and that said Letters Patent are hereby corrected as shown below:

In the Claims:

In Claim 1, column 12, line 44: change "II" to --H--.

Signed and Sealed this

Ninth Day of May 1978

[SEAL]

Attest:

RUTH C. MASON
Attesting Officer

LUTRELLE F. PARKER
Acting Commissioner of Patents and Trademarks